(12) United States Patent
Bottomley et al.

(10) Patent No.: US 7,724,841 B2
(45) Date of Patent: May 25, 2010

(54) METHOD AND APPARATUS FOR ITERATIVELY CALCULATING CHANNEL RESPONSE ESTIMATES

(75) Inventors: Gregory E. Bottomley, Cary, NC (US); Carmela Cozzo, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 846 days.

(21) Appl. No.: 11/538,074

(22) Filed: Oct. 3, 2006

(65) Prior Publication Data

US 2008/0080646 A1   Apr. 3, 2008

(51) Int. Cl.
H04L 27/00   (2006.01)
(52) U.S. Cl. ...................................... 375/316
(58) Field of Classification Search .......... 375/267, 375/299, 347, 349, 142, 143, 144, 148, 150, 375/152, 316, 343, 346; 700/53; 45/101, 45/132–141, 63.1, 114.2, 278.1, 296
See application file for complete search history.

(56) References Cited

U.S. PATENT DOCUMENTS

| 5,822,380 | A | 10/1998 | Bottomley |
| 2004/0198296 | A1* | 10/2004 | Hui et al. ............... 455/296 |
| 2005/0069023 | A1 | 3/2005 | Bottomley et al. |
| 2005/0201447 | A1 | 9/2005 | Cairns et al. |
| 2006/0182204 | A1 | 8/2006 | Cairns et al. |
| 2006/0251156 | A1 | 11/2006 | Grant et al. |

FOREIGN PATENT DOCUMENTS

| EP | 1379040 | 1/2004 |
| WO | 0101594 A1 | 1/2001 |
| WO | WO 01/61950 | 8/2001 |
| WO | 2005096518 A1 | 10/2005 |
| WO | WO 2005/096517 | 10/2005 |
| WO | WO 2006/010159 | 1/2006 |

(Continued)

OTHER PUBLICATIONS

Diggavi, Suhas, et al. "An Interference Suppression Scheme with Joint Channel-Data Estimation." IEEE Journal on Selected Areas in Communication, Nov. 1999, pp. 1924-1939, vol. 17, No. 11.

(Continued)

Primary Examiner—Sam K Ahn
(74) Attorney, Agent, or Firm—Coats & Bennett, P.L.L.C.

(57) ABSTRACT

Channel response and impairment correlation estimates are iteratively determined. According to one embodiment of performing channel estimation for use in received signal processing, a channel response estimate is calculated based on an initial impairment correlations estimate and a measured channel response derived from a received signal. A revised impairment correlations estimate is calculated using a parametric approach based on the channel response estimate and the channel response estimate is recalculated based on the revised impairment correlations estimate. According to one embodiment of a wireless communication device, the device comprises a parameter estimation unit configured to iteratively calculate a medium channel response estimate based on a parametric impairment correlations estimate and a measured net channel response derived from a received signal. The wireless communication device also comprises circuitry configured to control how many times the parameter estimation unit calculates the medium channel response estimate.

35 Claims, 3 Drawing Sheets

FOREIGN PATENT DOCUMENTS

WO   2008/057018 A1   5/2008

OTHER PUBLICATIONS

Chaufray, Jean-Marie, et al. "Consistent Estimation of Rayleigh Fading Channel Second-Order Statistics in the Context of the Wideband CDMA Mode of the UMTS." IEEE Transactions on Signal Processing, Dec. 2001, pp. 3055-3061, vol. 49, No. 12.

Wang, Hai et al., "Approaches for Fast, Adaptive, Generalized Rake Reception." Research Disclosure Journal. Nov. 2003, 3 pages, No. 475041, Kenneth Mason Publications, Ltd.

Dogandzic, Aleksandar, et al. "Semi-Blind SIMO Flat-Fading Channel Estimation in Unknown Spatially Correlated Noise Using the EM Algorighm." IEEE Transactions on Signal Processing, Jun. 2004, pp. 1791-1797, vol. 52, No. 6.

Cairns et al., "Low Complexity Parameter Estimation for the Generalized Rake Receiver," 2004 IEEE 11th Digital Signal Processing Workshop & IEEE Signal Processing Education Workshop, Aug. 1, 2004, pp. 191-195, XP10806726.

Kutz et al., "Low Complexity Implementation of a Downlink CDMA Generalized Rake Receiver," IEEE Vehicular Technology Conference, Sep. 24, 2002, pp. 1357-1361, vol. 1, XP10608650.

Co-pending International Application No. PCT/SE2006/050458 filed Nov. 7, 2006.

* cited by examiner

METHOD AND APPARATUS FOR ITERATIVELY CALCULATING CHANNEL RESPONSE ESTIMATES

BACKGROUND

The present invention generally relates to wireless communication devices, and particularly relates to iteratively calculating a channel response estimate for use in received signal processing.

Signals transmitted in a wireless communication system such as a Code Division Multiple Access (CDMA) or Wideband CDMA (WCDMA) system are subjected to multiple sources of interference and noise as they propagate via radio channels. The interference and noise components that affect signal transmission and reception in a wireless communication system are broadly referred to as impairments. Certain types of impairments may be correlated. That is, two seemingly independent signal impairments may in fact be related, and thus are said to be correlated. Some conventional receiver types such as a Generalized-RAKE (G-RAKE) receiver and its Chip Equalizer (CEQ) counterpart use knowledge of impairment correlations to improve received signal processing. G-RAKE receivers and CEQs also use an estimate of a multipath fading channel response in their received signal processing.

For example, a G-RAKE receiver includes various signal "fingers" where each finger has an assigned path delay for receiving a particular image of a multipath signal and a correlator for de-spreading the received image. In combination, the signal fingers de-spread multiple signal images of a received multipath signal, thus utilizing the multipath channel dispersion phenomenon. Additional "probing fingers" may be placed off path delays for capturing impairment correlations information. The finger outputs are weighted and coherently combined to improve received signal demodulation and/or received signal quality reception estimation, e.g., signal-to-interference (plus noise) (SIR) estimation. The processing weights assigned to the finger outputs are conventionally a function of the channel response and impairment correlations. As such, knowledge of signal impairments may be used to improve received signal processing. In a similar manner, CEQs utilize impairment correlations information for improving received signal processing where the selection of equalization filter taps in a CEQ is comparable to the placement of fingers in a G-RAKE receiver and the generation of equalization filter coefficients is comparable to the generation of G-RAKE combining weights.

Parametric G-RAKE receivers estimate impairment correlations using a modeling approach. The model employs parameters, sometimes referred to as fitting parameters, that can be estimated in a number of ways such as least-squares fitting. The parametric impairment correlations modeling process depends on corresponding model fitting parameters and on estimates of the channel response. However, signal impairments affect the channel response estimation process, particularly when the impairments are severe. As such, impairment correlation estimation and channel response estimation may be interdependent, particularly when interference is severe.

SUMMARY

According to the methods and apparatus taught herein, channel response and impairment correlation estimates are iteratively determined. The parameter estimates may be used in received signal processing, e.g., demodulation or signal quality reception estimation. Iteratively calculating channel response and impairment correlation estimates improves parameter estimation accuracy and reliability by accounting for interdependencies between impairment correlations and channel response.

According to one embodiment of a receiver circuit, the receiver comprises a baseband processor. The baseband processor is configured to calculate a channel response estimate based on an initial impairment correlations estimate and a measured channel response derived from a received signal. The baseband processor uses a parametric approach such as least-squares approximation to calculate a revised impairment correlations estimate based on the channel response estimate. The baseband processor then recalculates the channel response estimate based on the revised impairment correlations estimate.

According to one embodiment of a wireless communication device, the device comprises a parameter estimation unit configured to iteratively calculate a medium channel response estimate based on a parametric impairment correlations estimate and a measured net channel response derived from a received signal. The wireless communication device also comprises circuitry configured to control how many times the parameter estimation unit calculates the medium channel response estimate.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
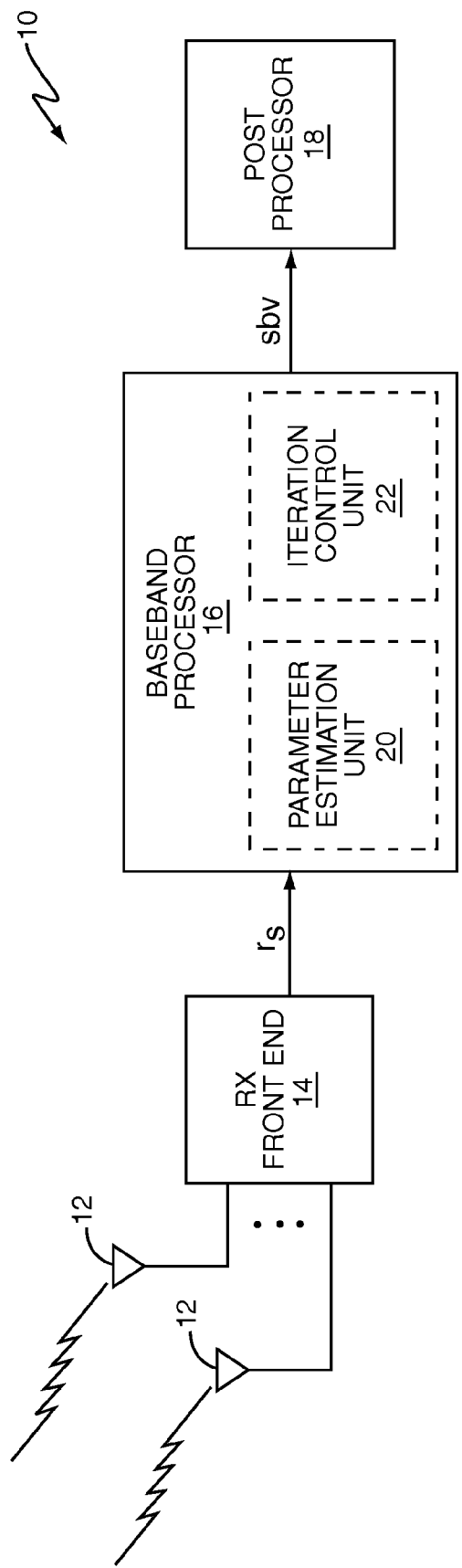
FIG. 1 is a block diagram of one embodiment of a wireless communication device having a baseband processor that iteratively calculates channel response and impairment correlation estimates.

FIG. 1 illustrates an embodiment of a wireless communication device 10 such as a base station, a cellular phone or other mobile communications terminal or device. The wireless communication device 10 has one or more antennas 12, front-end circuitry 14, a baseband processor 16 and a post processor 18. The antenna(s) 12 receive signal energy propagated over one or more multipath fading channels and the front end circuitry 14 filters and down-converts received signals to produce corresponding baseband signals ($r_s$). The signal energy received by the antenna(s) 12 may have propagated to the wireless communication device 10 via a downlink communication channel or via an uplink link communication channel such as a Wideband Code Division Multiple Access (W-CDMA) DPCCH channel. Regardless, the baseband processor 16, e.g. a G-RAKE receiver or chip equalizer, produces soft bit values (sbv) or symbol estimates based on the baseband signals. The post processor 18 performs other signal processing operations on the soft bit values, e.g., error correction, hard-decision decoding, etc.

The baseband processor 16 includes a parameter estimation unit 20 that employs an iterative channel response estimation process that is based in-part on impairment correlations estimates. The parameter estimation unit 20 generates the impairment correlations estimates using a parametric modeling process that is based in-part on the channel response estimates it generates. As such, interdependencies between impairment correlations and channel response are reflected in both the impairment correlations and channel response estimates generated by the parameter estimation unit 20, thus improving parameter estimation accuracy and reliability.

An iteration control unit 22 included in or associated with the baseband processor 16 determines how many times the parameter estimation unit 20 re-calculates the channel response and impairment correlations estimates. This enables the baseband processor 16 to refine the parameter estimates based on a desired number of iterations. In one embodiment, the parameter estimation process continues for a predefined number of iterations. In another embodiment, the parameter estimation process continues until a threshold is satisfied, e.g., until an acceptable variation between consecutively estimated values occurs. Regardless, the wireless communication device 10 uses the parameter estimates produced by the parameter estimation unit 20 for received signal processing, e.g., demodulation or signal quality reception estimation.

Figure 2:
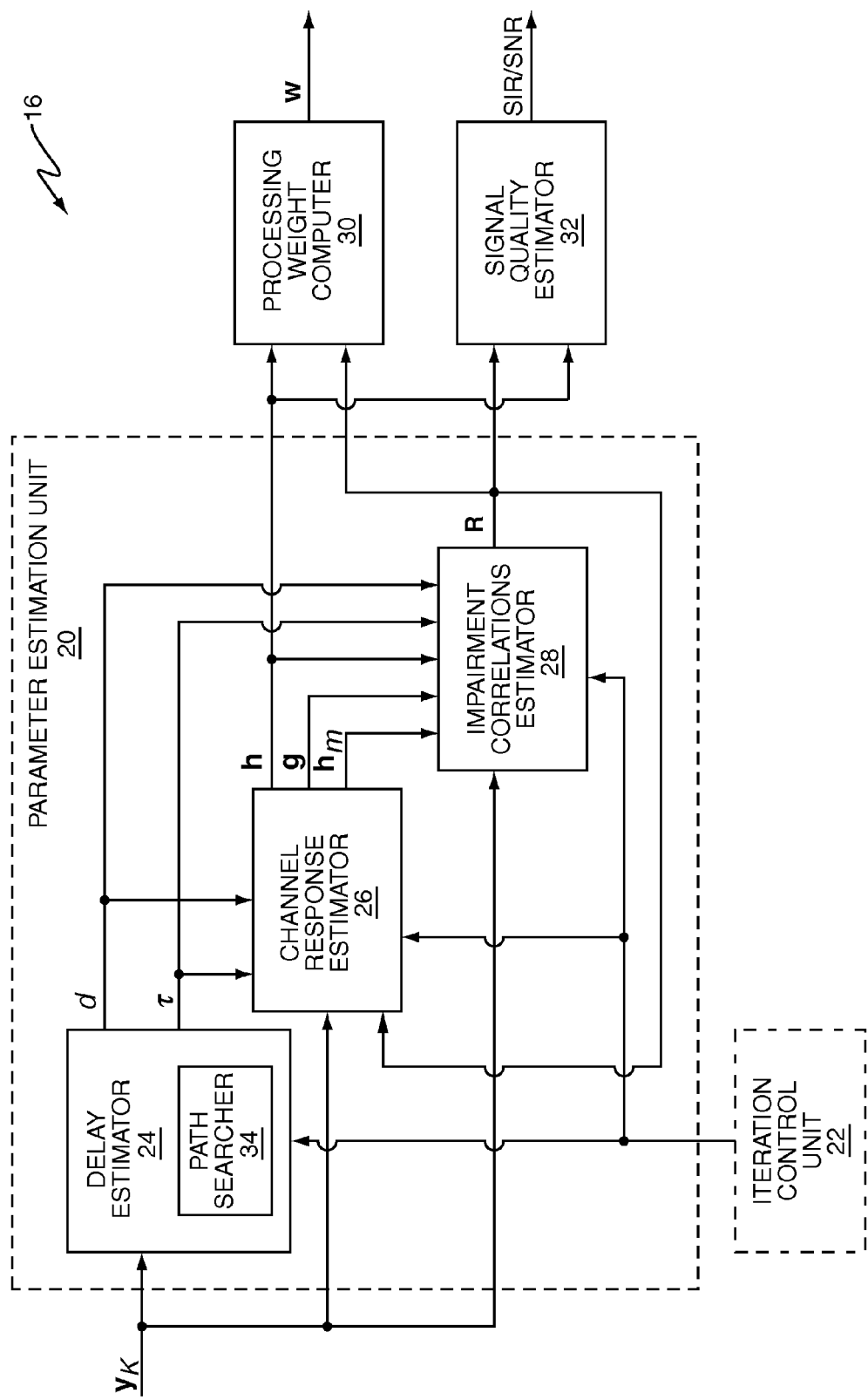
FIG. 2 is a block diagram of one embodiment of the baseband processor included in the wireless communication device of FIG. 1.

FIG. 2 illustrates one embodiment of the baseband processor 16 including the parameter estimation unit 20 and the iteration control unit 22. According to this embodiment, the parameter estimation unit 20 includes a delay estimator 24, a channel response estimator 26 and an impairment correlations estimator 28. The delay estimator 24 generates an estimate of a set of M channel path delays τ associated with one or more multipath fading channels from which signals are received, e.g., by evaluating an impulse response of the channel(s) over a range of delay values. The delay estimator 24 also generates a set of J signal processing delays d used for de-spreading received signals (e.g., G-RAKE finger delays or chip equalizer filter tap locations). Note that the path delays may be a subset of the processing delays. The signal processing delay values and path delay values are provided to the channel response estimator 26 and the impairment correlations estimator 28 for use in generating channel response and impairment correlation estimates, respectively.

The channel response estimator 26 calculates a medium channel response estimate g using the path delays and a net channel response estimate h using the signal processing delays. The medium and net channel response estimates are used by the impairment correlations estimator 28 to generate an impairment correlations matrix R. In turn, the channel response estimator 26 uses the impairment correlations matrix to revise the medium and net channel response estimates. The iteration control unit 22 determines how many times the parameter estimates are revised.

Figure 3:
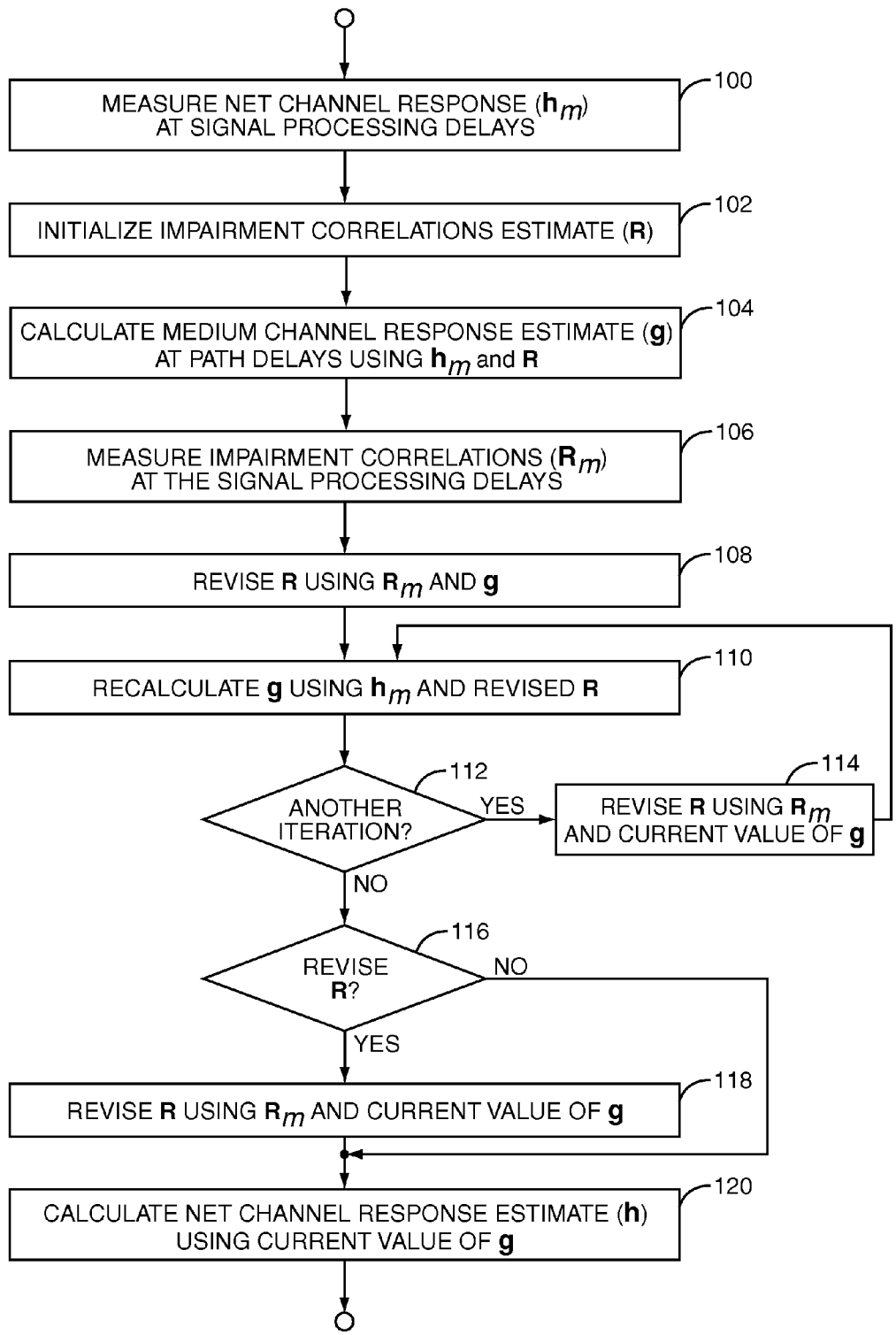
FIG. 3 illustrates one embodiment of processing logic for iteratively calculating channel response and impairment correlation estimates.

In more detail, the medium channel response estimate g reflects the response of each multipath fading channel delay being considered while the net channel response estimate h reflects the overall response of the signal transmission system, including the response of the transmitter, the channel and the receiver. As part of calculating the channel response estimates, the channel response estimator 26 first measures the net channel response based on de-spread pilot symbols, training data, or other signals known a priori to the wireless communication device 10. In one embodiment, the net channel response is measured by averaging pilot symbol de-spread values $y_k$ at any of the given signal processing delays d as given by:

$$h_m = \frac{1}{K}\sum_{k=1}^{K} y_k \quad (1)$$

where $h_m$ is the measured net channel response and K is the symbol period number of pilot symbols, as illustrated by Step 100 of FIG. 3.

Before the channel response estimator 26 calculates the medium and net channel response estimates, the impairment correlations estimator 28 initializes the impairment correlations matrix R, as illustrated by Step 102 of FIG. 3. The impairment correlations matrix is a J×J matrix where J corresponds to the number of signal processing delays d. In one embodiment, the impairment correlations matrix R is initialized to a normalized noise correlations matrix $R_n$ as given by:

$$R = R_n \quad (2)$$

The mth row and jth column of the normalized noise correlations matrix $R_n$ is given by:

$$r_r(d_j - d_m) \approx r_p(d_j - d_m) \quad (3)$$

where $r_r(\tau)$ is the receive filter autocorrelation function (known or estimated) which can be approximated by $r_p(\tau)$, the chip pulse autocorrelation function.

After the impairment correlations matrix has been initialized, the channel response estimator 26 calculates an initial estimate of the medium channel response g at the path delays τ, as illustrated by Step 104 of FIG. 3. According to one embodiment, the medium channel response estimate g is calculated in accordance with a one-step Minimum-Mean-Square-Error (MMSE) process as given by:

$$g = R_g B^H (B R_g B^H + R)^{-1} h_m \quad (4)$$

where B is a J×M matrix that relates the medium channel response at the path delays τ to the measured net channel response at the signal processing delays d. The element of the B matrix in the mth row and jth column is given by:

$$b_{m,j} = r_{tr}(d_j - \tau_m) \approx r_p(d_j - \tau_m) \quad (5)$$

where $r_{tr}(d_j - \tau_m)$ is the convolution of the transmit and receive filters (not shown), which can be approximated as the chip pulse autocorrelation function $r_p(\tau)$.

The matrix $R_g$ corresponds to the path coefficients correlation matrix (fading correlations matrix), which can be estimated using known techniques, such as averaging outer products of estimates of g. An approximate form can be used, in which $R_g$ is constrained to be a diagonal matrix whose diagonal elements represent the average powers of the channel coefficients at the path delays τ. When the fading correlations matrix is constrained to be diagonal, the measurement of the net channel response for the jth processing delay is given by:

$$|h_{m,j}|^2 = |g_j|^2 + |i_j|^2 + |n_j|^2 \quad (6)$$

where $|h_{m,j}|^2$ represents the average power of the net channel coefficient measurement at the jth processing delay, $|g_j|^2$ is the average power of the medium channel coefficient at the jth processing delay. The second and third terms in equation 6 represent interference and noise powers, respectively. The sum of the interference and noise power terms corresponds to the diagonal element of the impairment correlations matrix R for the jth processing delay. Alternatively, the interference and noise power terms may be lumped into a single impairment power term. Regardless, since the impairment correlations matrix is estimated, the average of $|g_j|^2$ may be computed via a simple subtraction from an average of the net response and constraining the value to be positive (if the subtraction yields a negative value, $|g_j|^2$ is set to a negligible value, e.g., zero).

According to another embodiment, the medium channel response estimate is calculated in accordance with a two-step MMSE process where an MMSE estimate of the net channel response $h_{MMSE}$ is first calculated as given by:

$$h_{MMSE} = BR_g B^H (BR_g B^H + R)^{-1} h_m \quad (7)$$

Next, an MMSE estimate of the medium channel response $g_{MMSE}$ is generated from the MMSE estimate of the net channel response as given by:

$$g_{MMSE} = (B^H B)^{-1} B^H h_{MMSE} \quad (8)$$

According to yet another embodiment, the medium channel response estimate is calculated in accordance with a Maximum Likelihood (ML) estimation process as given by:

$$g = (B^H R^{-1} B)^{-1} B^H R^{-1} h_m \quad (9)$$

In addition to generating an initial estimate of the medium channel response and measuring the net channel response, the parameter estimation unit 20 also measures the impairment correlations at the signal processing delays d, as illustrated by Step 106 of FIG. 3. In one embodiment, the impairment correlations estimator 28 measures impairment correlations based on the measured net channel response $h_m$ and the de-spread pilot symbols $y_k$ as given by:

$$R_m = \frac{1}{K-1} \sum_{k=1}^{K} (y_k - h_m)(y_k - h_m)^H \quad (10)$$

where $R_m$ is the resulting J×J impairment correlations matrix. In another embodiment, the impairment correlations estimator 28 measures impairment correlations based on the net channel response h as given by:

$$R_m = \frac{1}{K-1} \sum_{k=1}^{K} (y_k - h)(y_k - h)^H \quad (11)$$

where the net channel response is estimated from the medium channel response estimate g as given by:

$$h = Bg \quad (12)$$

At this point, the parameter estimation unit 20 has measured both the net channel response ($h_m$) and the impairment correlations ($R_m$) using de-spread pilot symbols or other signals known a priori to the wireless communication device 10. The parameter estimation unit 20 has also generated an initial estimate of the medium channel response (g). The impairment correlations estimator 28 then uses these parameters to generate model fitting parameters that are used to revise the impairment correlations estimate R which was previously initialized to a normalized noise correlations estimate, as illustrated by Step 108 of FIG. 3. In one embodiment, a parametric model fitting process such as least-squares fitting is employed to generate the model fitting parameters α and β as given by:

$$R_m \approx \alpha R_f(g) + \beta R_N \quad (13)$$

where $R_N$ is a noise correlations term and $R_f(g)$ is an interference correlations term having elements associated with the medium channel response estimate. The interference and noise correlations terms may be determined in accordance with any suitable formulation, e.g., the formulations given in co-pending and commonly assigned U.S. patent application Ser. No. 10/800,167 filed on Mar. 12, 2004 which is incorporated herein by reference in its entirety.

The model fitting parameters α and β scale the respective interference and noise terms based on their corresponding impairment (interference and/or noise) power contribution. These fitting parameters may be obtained using the model fitting process or using other approaches that obtain noise and interference power estimates. Those skilled in the art will readily recognize that additional impairment correlation terms may be included in the model fitting process, thus yielding additional model fitting parameters, e.g., own-cell and other-cell interference terms. Further details relating to the parametric model fitting process are not necessary for understanding the present invention, as those skilled in the art will readily recognize that various model fitting processes may be used to generate model fitting parameters. Nonetheless, exemplary details for generating model fitting parameters may be obtained from aforementioned U.S. patent application Ser. No. 10/800,167 which was previously incorporated by reference in its entirety.

Regardless as to how the model fitting parameters are determined, the impairment correlations estimator 28 then uses the model fitting parameters to revise the initial impairment correlations estimate R as given by:

$$R = \alpha R_f(g) + \beta R_N \quad (14)$$

As such, the revised impairment correlations estimate R is based on both the medium channel response estimate g and the model fitting parameters, which may be determined using the measured impairment correlations matrix $R_m$. The estimate in (14) is a "parametric" estimate of R, as opposed to a "nonparametric" estimate of R such as smoothing of the measured impairment correlations. The medium channel response estimate is revised at least one time during the parameter estimation process. The medium channel response estimate may be recalculated in accordance with equations 4 through 9 where the initial impairment correlations matrix is replaced with the revised matrix, as illustrated by Step 110 of FIG. 3.

After the initial medium channel response estimate has been revised once, the iteration control unit 22 determines whether the parameter estimation process is to continue, as illustrated by Step 112 of FIG. 3. If a subsequent iteration is to occur, the impairment correlations estimator 28 is permitted to revise the impairment correlations estimate using the current medium channel response estimate and the model fitting process, as illustrated by Step 114 of FIG. 3. The model fitting parameters may be updated each time the impairment correlations estimate is revised, e.g., in accordance with equations 13 and 14 where $R_f(g)$, α, and β are each updated. Alternatively, prior model fitting parameter values may be used to revise the impairment correlations estimate, e.g., in accordance with equation 14 where $R_f(g)$ is updated, but α and β are not. Regardless, the channel response estimator 26 recalculates the medium channel response estimate using the newly revised impairment correlations estimate (Step 110 of FIG. 3). The parameter estimation process continues until the iteration control unit 22 determines that the process is to cease or until aborted (Step 112 of FIG. 3). For example, the process may be terminated after a fixed number of iterations or until the change in revising the channel estimate and/or the impairment correlations matrix is small (e.g., sum of squared differences).

When the parameter estimation process is terminated, the parameter estimation unit 20 determines whether the impairment correlations estimate R is to be revised one final time, as illustrated by Step 116 of FIG. 3. If so, the impairment correlations estimator 28 revises the impairment correlations estimates using the current medium channel response estimate and the model fitting process, as illustrated by Step 118 of FIG. 3. If not, the impairment correlations estimate is not revised. Either way, the channel response estimator 26 generates a net channel response estimate h based on the current value of the medium channel response as given by equation 12, as illustrated by Step 120 of FIG. 3.

The baseband processor 16 uses the net channel response estimate h for received signal processing. In one embodiment, the baseband processor 16 further includes a processing weight computer 30 for calculating processing weights w such as G-RAKE combining weights or equalizer filter tap coefficients based on the current value of the impairment correlations estimate as given by:

$$w = R^{-1}h \qquad (15)$$

The baseband processor 16 may also have a signal quality estimator 32 for generating an estimate of received signal quality such as a signal-to-impairment ratio (SIR) based on the current value of the impairment correlations estimate. In a G-RAKE embodiment, the signal quality estimator 32 calculates SIR as given by:

$$SIR = h^H R^{-1} h \qquad (16)$$

In a RAKE embodiment, the signal quality estimator 32 calculates SIR as given by:

$$SIR = \frac{(g^H h)^2}{g^H R h} \qquad (17)$$

or, less accurately, as:

$$SIR = \frac{(h^H h)^2}{h^H R h} \qquad (18)$$

Optionally, an additional scaling factor may be generated to account for power offsets between received communication channels of interest.

The iteration control unit 22 included in or associated with the baseband processor 16 may select a subset of the available processing delays d for use in received signal processing. As such, not all processing delays may be used when processing received signals. The iterative parameter estimation process described herein may be based on all available processing delays, or alternatively, it may be based on the M path delays selected by a path searcher 34. As such, the delays used in the iterative parameter estimation process may be dynamically altered. That is, the baseband processor 16 may alter the delays used in calculating channel response and impairment correlation parameters during different stages of the estimation process.

The delay values used in the parameter estimation process may be altered on a per iteration basis, per grouping of iterations, or may be selected once during initiation of the iterative parameter estimation process. As such, the baseband processor 16 is capable of varying the delay values used during parameter estimation, thus reducing complexity of the estimation process and reducing estimation errors early in the iterative process. The ML estimate of the medium channel response g as given by equation 9 reduces to the following if the parameter estimation process uses the delays selected by the path searcher 34:

$$g = B_M^{-1} h \qquad (19)$$

where $B_M$ is an M×M matrix as described in (5).

According to another embodiment, the channel response estimator 26 may measure the net channel response $h_m$ at a subset A of the available processing delays d. As such, if the measured impairment correlations matrix $R_m$ is calculated based on the measured net channel response $h_m$ in accordance with equation 10, then measured net channel response values corresponding to G-RAKE fingers or equalizer filter taps not included in the subset may be set to zero. As such, the overall impairment correlations matrix R associated with all of the available processing delays d has a size of J×J which corresponds to the d delays. A second impairment correlations matrix $R_A$ associated with the selected subset of processing delays A has a size of A×A which corresponds to the subset of A delays. As such, $R_A$ is used in place of R in equations 2 through 9 and the matrix B has a size of A×M. In the remainder of the equations, the overall impairment correlations matrix R of J×J is used.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of performing channel estimation by a baseband processor included in a wireless communication device for use in received signal processing, comprising:

calculating a medium channel response estimate by the baseband processor based on an initial impairment correlations estimate and a measured net channel response derived from a received signal, the medium channel response estimate representing the response of each multipath fading channel delay under consideration, the measured net channel response representing an overall response of an entire signal transmission path, including transmitter, channel and receiver responses;

calculating a revised impairment correlations estimate by the baseband processor using a parametric approach based on the medium channel response estimate; and recalculating the medium channel response estimate by the baseband processor based on the measured net channel response and the revised impairment correlations estimate.

2. The method of claim 1, wherein calculating a medium channel response estimate by the baseband processor based on an initial impairment correlations estimate and a measured net channel response derived from a received signal comprises calculating the medium channel response estimate by the baseband processor using a maximum-likelihood estimation process.

3. The method of claim 2, wherein calculating the medium channel response estimate by the baseband processor using a maximum-likelihood estimation process comprises calculating the medium channel response estimate by the baseband processor based on the initial impairment correlations estimate, the measured net channel response and information relating channel response at path delays to channel response at processing delays.

4. The method of claim 1, wherein calculating a medium channel response estimate by the baseband processor based on an initial impairment correlations estimate and a measured net channel response derived from a received signal comprises calculating the medium channel response estimate by the baseband processor using a minimum-mean square error (MMSE) estimation process.

5. The method of claim 4, wherein calculating the medium channel response estimate by the baseband processor using a MMSE estimation process comprises calculating the medium channel response estimate by the baseband processor based on the initial impairment correlations estimate, the measured net channel response and an average power associated with individual channel coefficients.

6. The method of claim 4, wherein calculating the medium channel response estimate by the baseband processor using a MMSE estimation process comprises:
   calculating a net channel response estimate by the baseband processor based on the initial impairment correlations estimate, the measured net channel response and an average power associated with individual channel coefficients; and
   calculating the medium channel response estimate by the baseband processor based on the net channel response estimate.

7. The method of claim 6, wherein the average power associated with individual channel coefficients is calculated by the baseband processor based on an average power associated with individual net channel coefficients and impairment power.

8. The method of claim 1, wherein calculating a revised impairment correlations estimate by the baseband processor using a parametric approach based on the medium channel response estimate comprises:
   calculating one or more model fitting parameters by the baseband processor based on the medium channel response estimate; and
   calculating the revised impairment correlations estimate by the baseband processor based on the one or more model fitting parameters.

9. The method of claim 1, wherein recalculating the medium channel response estimate by the baseband processor based on the measured net channel response and the revised impairment correlations estimate comprises recalculating the medium channel response estimate by the baseband processor using a maximum-likelihood estimation process.

10. The method of claim 9, wherein recalculating the medium channel response estimate by the baseband processor using a maximum-likelihood estimation process comprises recalculating the medium channel response estimate by the baseband processor based on the revised impairment correlations estimate, the measured net channel response and information relating channel response at path delays to channel response at processing delays.

11. The method of claim 1, wherein recalculating the medium channel response estimate by the baseband processor based on the measured net channel response and the revised impairment correlations estimate comprises recalculating the medium channel response estimate by the baseband processor using a minimum-mean square error (MMSE) estimation process.

12. The method of claim 11, wherein recalculating the medium channel response estimate by the baseband processor using a MMSE estimation process comprises recalculating the medium channel response estimate by the baseband processor based on the revised impairment correlations estimate, the measured net channel response and an average power associated with individual channel coefficients.

13. The method of claim 11, wherein recalculating the medium channel response estimate by the baseband processor using a MMSE estimation process comprises:
   recalculating a net channel response estimate by the baseband processor based on the revised impairment correlations estimate, the measured net channel response and an average power associated with individual channel coefficients; and
   recalculating the medium channel response estimate by the baseband processor based on the net channel response estimate.

14. The method of claim 1, further comprising recalculating the revised impairment correlations estimate by the baseband processor based on the recalculated medium channel response estimate.

15. The method of claim 14, wherein recalculating the revised impairment correlations estimate by the baseband processor based on the recalculated medium channel response estimate comprises:
   calculating one or more model fitting parameters by the baseband processor based on the recalculated medium channel response estimate; and
   recalculating the revised impairment correlations estimate by the baseband processor based on the one or more model fitting parameters.

16. The method of claim 15, wherein the one or more model fitting parameters are recalculated by the baseband processor each time the revised impairment correlations estimate is recalculated.

17. A receiver circuit comprising a baseband processor configured to calculate a medium channel response estimate based on an initial impairment correlations estimate and a measured net channel response derived from a received signal, calculate a revised impairment correlations estimate using a parametric approach based on the medium channel response estimate, and recalculate the medium channel response estimate based on the measured net channel response and the revised impairment correlations estimate, wherein the medium channel response estimate represents the response of each multipath fading channel delay under consideration and the measured net channel response represents an overall response of an entire signal transmission path, including transmitter, channel and receiver responses.

18. The receiver circuit of claim 17, wherein the baseband processor is configured to calculate the medium channel response estimate using a maximum-likelihood estimation process.

19. The receiver circuit of claim 18, wherein the baseband processor is configured to calculate the medium channel response estimate based on the initial impairment correlations estimate, the measured net channel response and information relating channel response at path delays to channel response at processing delays.

20. The receiver circuit of claim 17, wherein the baseband processor is configured to calculate the medium channel response estimate using a minimum-mean square error (MMSE) estimation process.

21. The receiver circuit of claim 20, wherein the baseband processor is configured to calculate the medium channel response estimate based on the initial impairment correlations estimate, the measured net channel response and an average power associated with individual channel coefficients.

22. The receiver circuit of claim 20, wherein the baseband processor is configured to calculate a net channel response estimate based on the initial impairment correlations estimate, the measured net channel response and an average power associated with individual channel coefficients and calculate the medium channel response estimate based on the net channel response estimate.

23. The receiver circuit of claim 22, wherein the average power associated with individual channel coefficients is calculated based on an average power associated with individual net channel coefficients and impairment power.

24. The receiver circuit of claim 17, wherein the baseband processor is configured to calculate one or more model fitting parameters based on the medium channel response estimate and calculate the revised impairment correlations estimate based on the one or more model fitting parameters.

25. The receiver circuit of claim 17, wherein the baseband processor is configured to recalculate the medium channel response estimate using a maximum-likelihood estimation process.

26. The receiver circuit of claim 25, wherein the baseband processor is configured to recalculate the medium channel response estimate based on the revised impairment correlations estimate, the measured net channel response and information relating channel response at path delays to channel response at processing delays.

27. The receiver circuit of claim 17, wherein the baseband processor is configured to recalculate the medium channel response estimate using a minimum-mean square error (MMSE) estimation process.

28. The receiver circuit of claim 27, wherein the baseband processor is configured to recalculate the medium channel response estimate based on the revised impairment correlations estimate, the measured net channel response and an average power associated with individual channel coefficients.

29. The receiver circuit of claim 27, wherein the baseband processor is configured to recalculate a net channel response estimate based on the revised impairment correlations estimate, the measured net channel response and an average power associated with individual channel coefficients and recalculate the medium channel response estimate based on the net channel response estimate.

30. The receiver circuit of claim 17, wherein the baseband processor is further configured to recalculate the revised impairment correlations estimate based on the recalculated medium channel response estimate.

31. The receiver circuit of claim 30, wherein the baseband processor is configured to calculate one or more model fitting parameters based on the recalculated medium channel response estimate and recalculate the revised impairment correlations estimate based on the one or more model fitting parameters.

32. The receiver circuit of claim 31, wherein the one or more model parameters are recalculated each time the revised impairment correlations estimate is recalculated.

33. The receiver circuit of claim 17, wherein the baseband processor is further configured to generate, based on the medium channel response estimate and the revised impairment correlations estimate, one or more processing weights and a received signal quality indication.

34. The receiver circuit of claim 33, wherein the one or more processing weights comprise one of G-RAKE combining weights or equalization filter coefficients.

35. A wireless communication device including the receiver circuit of claim 17.

* * * * *

UNITED STATES PATENT AND TRADEMARK OFFICE
CERTIFICATE OF CORRECTION

PATENT NO. : 7,724,841 B2
APPLICATION NO. : 11/538074
DATED : May 25, 2010
INVENTOR(S) : Bottomley et al.

It is certified that error appears in the above-identified patent and that said Letters Patent is hereby corrected as shown below:

On the Title Page, in Item (58), under "Field of Classification Search", in Column 1, Lines 3-4, delete "45/101, 45/132-141," and insert -- 455/101, 455/132-141, --, therefor.

On Title Page 2, in Item (56), under "OTHER PUBLICATIONS", in Column 2, Line 3, delete "Algorighm."" and insert -- Algorithm." --, therefor.

Signed and Sealed this

Ninth Day of November, 2010

David J. Kappos
*Director of the United States Patent and Trademark Office*